US012711070B2

(12) United States Patent
Chuan

(10) Patent No.: US 12,711,070 B2
(45) Date of Patent: Aug. 18, 2026

(54) HARDWARE PIPELINE FOR CACHE COHERENT INTERCONNECT INCLUDING SNOOP FILTERS

(71) Applicant: ARTERIS, INC., Campbell, CA (US)

(72) Inventor: Boon Chuan, Scotts Valley, CA (US)

(73) Assignee: ARTERIS, INC., Campbell, CA (US)

( * ) Notice: Subject to any disclaimer, the term of this patent is extended or adjusted under 35 U.S.C. 154(b) by 37 days.

(21) Appl. No.: 19/021,094

(22) Filed: Jan. 14, 2025

(65) Prior Publication Data

US 2026/0203223 A1 Jul. 16, 2026

(51) Int. Cl.
*G06F 12/0817* (2016.01)
*G06F 11/08* (2006.01)

(52) U.S. Cl.
CPC .......... *G06F 12/0828* (2013.01); *G06F 11/08* (2013.01); *G06F 2212/621* (2013.01)

(58) Field of Classification Search
CPC . G06F 12/0828; G06F 2212/621; G06F 11/08
See application file for complete search history.

(56) References Cited

U.S. PATENT DOCUMENTS 6,038,693 A * 3/2000 Zhang ................. G06F 11/1064 714/768
2016/0283326 A1* 9/2016 Hayashi ............ H03M 13/2906
2020/0371867 A1* 11/2020 Imaizumi ............ G06F 11/1032
2022/0139482 A1* 5/2022 Kim .................... G06F 11/1068 714/719

OTHER PUBLICATIONS

Patel, Minesh, Geraldo Francisco de Oliveira, and Onur Mutlu. “HARP: Practically and effectively identifying uncorrectable errors in memory chips that use on-die error-correcting codes.” MICRO-54: 54th Annual IEEE/ACM International Symposium on Microarchitecture. 2021. (Year: 2021).*

* cited by examiner

*Primary Examiner* — Nicholas J Simonetti
(74) *Attorney, Agent, or Firm* — Dana Legal Services; Jubin Dana

(57) ABSTRACT

A hardware-implemented pipeline for a set-associative snoop filter includes a syndrome generator circuit configured to receive a way entry including raw data and raw check bits, and generate a syndrome from the raw data and the raw check bits. The pipeline further includes a buffer configured to store the raw data, the raw check bits and the syndrome prior to data correction; and a data correction circuit configured to receive the raw data, the raw check bits, and the syndrome from the buffer and correct the raw data with the syndrome.

20 Claims, 6 Drawing Sheets

FIG. 3

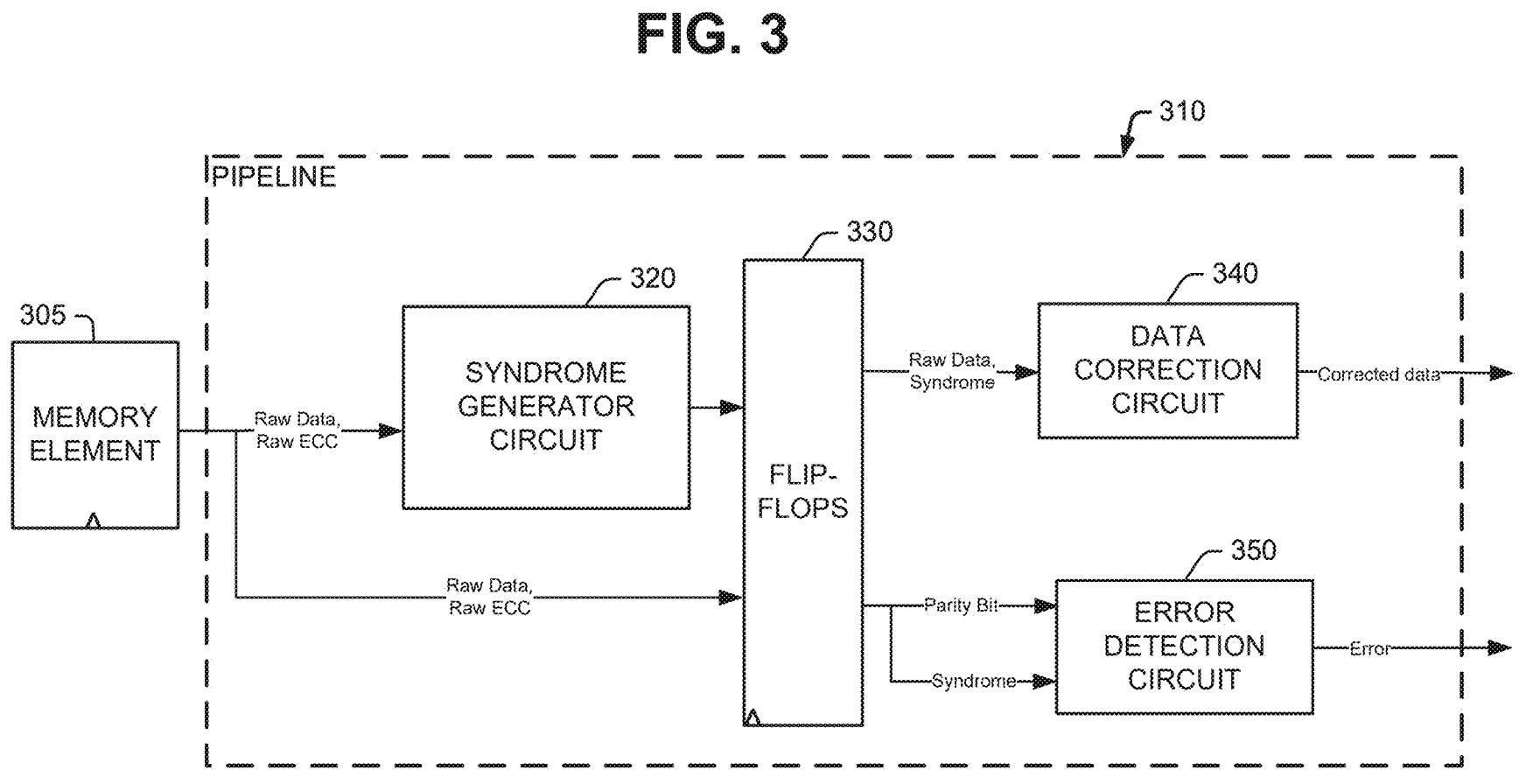

305
MEMORY ELEMENT

PIPELINE
310

Raw Data, Raw ECC

320
SYNDROME GENERATOR CIRCUIT

Raw Data, Raw ECC

330
FLIP-FLOPS

Raw Data, Syndrome

Parity Bit

Syndrome

340
DATA CORRECTION CIRCUIT

Corrected data

350
ERROR DETECTION CIRCUIT

Error

HARDWARE PIPELINE FOR CACHE COHERENT INTERCONNECT INCLUDING SNOOP FILTERS

TECHNICAL FIELD

The present technology is in the field of electronic systems and, more specifically, multi-core electronic systems.

BACKGROUND

A multi-core electronic system may include multiple processors or cores that communicate with shared memory. Data is transferred to and from the shared memory in blocks of fixed size, called "cache lines" or "cache blocks."

Cache coherence is a protocol that maintains consistency of data stored in shared memory. When multiple cores are accessing the same memory locations in shared memory, cache coherence ensures that any changes made by one core are immediately visible to all other cores, thereby preventing data inconsistencies.

A directory-based protocol is commonly used to ensure cache coherency. A directory may include multiple snoop filters. Each snoop filter contains entries that contain information about the states of allocated cache lines.

The snoop filter entries are stored in memory. A hardware-based pipeline receives a filter entry from the memory, and performs error detection and correction of data within the entry. A typical pipeline architecture includes a serial arrangement of high-drive buffer gates, a multiplexer, a ready valid pipe, an ECC decoder, and an ECC corrector (ECC stands for Error Correction Code). If an error in an entry is detected, data in the entry is corrected, and the corrected data is supplied to the multiplexer, which writes the corrected data back to the ready valid pipe.

Such an architecture can place backpressure on the pipeline. When single-bit error is detected, the pipeline is stalled one cycle to allow for data correction. Moreover, if all snoop filters in the directory are operating in lock step, then a one-cycle pipeline delay in one snoop filter will cause a one cycle delay in all of the snoop filters.

SUMMARY

In accordance with various embodiments and aspects herein, a hardware-implemented pipeline for a set-associative snoop filter includes a syndrome generator circuit configured to receive a way entry including raw data and raw check bits, and generate a syndrome from the raw data and the raw check bits. The pipeline further includes a buffer configured to store the raw data, the raw check bits and the syndrome prior to data correction; and a data correction circuit configured to receive the raw data, the raw check bits, and the syndrome from the buffer and correct the raw data with the syndrome.

In accordance with various embodiments and aspects herein, a cache-coherent interconnect for an electronic system includes an interconnect and a system directory for maintaining cache coherence of the interconnect. The system directory includes memory for storing a plurality of snoop filter way entries. The system directory further includes a plurality of pipelines for performing error correction on way entries. Each pipeline includes a syndrome generator circuit configured to receive a way entry including raw data and raw check bits, and generate a syndrome from the raw data and the raw check bits; and a buffer configured to store the raw data, the raw check bits and the syndrome prior to data correction. The pipeline further includes a data correction circuit configured to receive the raw data, the raw check bits, and the syndrome from the buffer and correct the raw data with the syndrome.

In accordance with various embodiments and aspects herein, an electronic system includes a plurality of caching agents and a cache-coherent interconnect including a system directory and an interconnect. The caching agents are configured to communicate with the directory via the interconnect. The system directory includes a plurality of snoop filters. Each snoop filter includes a plurality of way entries. The system directory further includes a plurality of pipelines. Each pipeline is associated with one of the way entries and performs data correction on the corresponding way entry. Each pipeline includes a syndrome generator circuit configured to receive the corresponding way entry, and generate a syndrome from raw data and raw check bits in the corresponding way entry; a buffer configured to store the raw data, the raw check bits and the syndrome prior to data correction; and a data correction circuit configured to receive the raw data, the raw check bits, and the syndrome from the buffer and correct the raw data with the syndrome.

BRIEF DESCRIPTION OF THE DRAWINGS

In order to understand the invention more fully, reference is made to the accompanying drawings. The invention is described in accordance with the aspects and embodiments in the following description with reference to the drawings or figures (FIG.), in which like numbers represent the same or similar elements. Understanding that these drawings are not to be considered limitations in the scope of the invention, the presently described aspects and embodiments and the presently understood best mode of the invention are described with additional detail through use of the accompanying drawings.

FIG. 3 shows a hardware pipeline for a snoop filter in accordance with various aspects and embodiments herein.

DETAILED DESCRIPTION

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. The examples provided are intended as non-limiting examples. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one embodiment," "an embodiment," "certain embodiment," "various embodiments," or similar language means that a particular aspect, feature, structure, or characteristic described in connection with the embodiment is included in at least one embodiment of the invention.

Thus, appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting principles, aspects, and embodiments of the invention are intended to encompass both structural and functional equivalents thereof. It is intended that such equivalents include both currently known equivalents and equivalents developed in the future. Furthermore, to the extent that the terms "including", "includes", "having", "has", "with", or variants thereof are used in either the detailed description and the claims, such terms are intended to be inclusive in a similar manner to the term "comprising."

Figure 1:
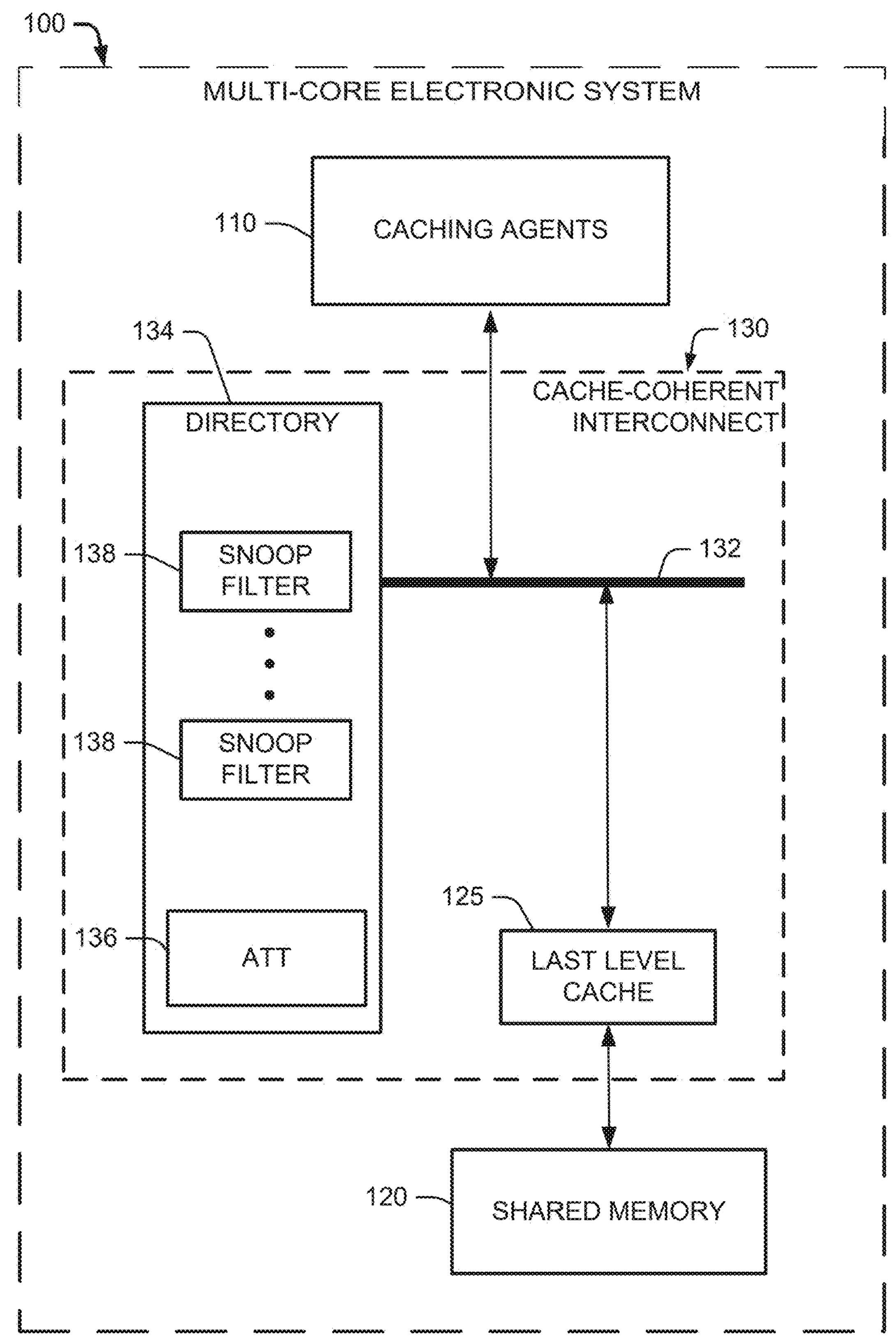
FIG. 1 shows an electronic system including a cache-coherent interconnect in accordance with various aspects and embodiments herein.

Reference is made to FIG. 1, which illustrates an electronic system 100 including multiple processors. Examples of the processors include, but are not limited to, central processing units (CPUs), graphical processing units (GPUs), and accelerators. Each processor may include one or individual processing units (cores).

A processor such as a CPU or GPU may have a hierarchy of multiple cache levels. A CPU, for instance, may include L1 cache, L2 cache, and L3 cache. Each core of the CPU may have its own L1 cache and L2 cache, and the different cores of the CPU may share the L3 cache. The cache is typically implemented with static random access memory (SRAM).

Such a processor may also implement a caching agent 110. The caching agent 110 has logic for maintaining coherency between caches in the cores and the L3 cache. The caching agent 110 also has an socket interface.

The electronic system 100 further includes shared memory 120 and a cache-coherent interconnect 130. The caching agents 110 are connected to the cache-coherent interconnect 130 via their socket interfaces. The shared memory 120 is accessible to the caching agents 110 via the cache-coherent interconnect 130.

In some embodiments, the shared memory 120 includes system memory. In some embodiments, the shared memory 120 may further include a separate cache in addition to the system memory. In some embodiments, the cache may be located inside the cache-coherent interconnect 130 as a system memory cache, or outside the cache-coherent interconnect 130 as a last level cache.

As used herein, a cache line refers to a data block of fixed size. Typically, the fixed size is 64 bytes. Cache lines may be stored in processor caches, the shared memory 120, and they may also be stored in any caches associated with the shared memory 120. An example of a cache associated with shared memory 120 is a last level cache 125. The last level cache 125 functions as a caching agent 110 for the shared memory 120.

The cache-coherent interconnect 130 includes an interconnect or interconnector 132. The caching agents 110 communicate with the shared memory 120 via the interconnect 132.

The cache-coherent interconnect 130 further includes a system directory 134. When multiple caching agents 110 are accessing the same memory locations in the shared caches and/or shared memory 120, the system directory 134 ensures that any changes made by one caching agent are immediately visible to all other caching agents, thereby preventing data inconsistencies. For example, the system directory 134 maintains consistency between L3 caches among different processor clusters.

The system directory 134 implements a point of serialization for establishing transaction ordering and sequences coherence operations and memory accesses. The directory 134 includes an active transition table (ATT) 136 that is configured to track coherent transactions. The ATT 136 includes multiple transaction entries. The entries may be state machines (implemented, for example, with flip-flops) that process command request messages. When the cache coherent interconnect 130 receives a command request message (e.g., a message that requests a copy of a cache line), the directory 134 allocates the message to an entry in the ATT 136.

The system directory 134 further includes one or more snoop filters 138. Each caching agent 110 is assigned to a snoop filter 138. In accordance with various aspects and embodiments, the system directory 134 includes timing circuitry for the snoop filters as outlined below.

Each snoop filter 138 may be a set-associative structure that stores a number N of sets, where each set has a number D of way entries. Such a snoop filter 138 supports N×D cache lines. Different snoop filters 138 may be configured with different depth (number of sets). Each snoop filter 138 may be configured to match the caching characteristics (e.g., number of ways, number of sets, address hashing function) of the associated caching agents 110.

Entries in a set-associative snoop filter 138 may be tagged by physical addresses. A tag of a way entry may be derived from the address of a corresponding cache line.

Each way entry includes information about states of the caching agents 110 with respect to a cache line. For instance, a way entry may include an owner pointer-sharer vector. The sharer vector identifies those caching agents 110 that are sharing the cache line. Each bit of the sharer vector is associated with a caching agent and indicates whether the associated caching agent is a sharer. The owner pointer designates one of the caching agents 110 as the owner of the cache line, and whether the owner has a valid copy of the cache line. For a coherent transaction that requires a valid copy of a cache line, only the owner is snooped, and for a coherent transaction that requires a unique copy of a cache line, the owner and each sharer are snooped.

A way entry may also include check bits. There is a chance that data stored in a snoop filter 138 will become corrupted. The check bits may be stored alongside the data bits to provide enough redundant bits of carefully chosen information, in order to detect or correct a limited number of memory bit errors. Error Correction Code (ECC) such as SECDED (Single Error Correct, Double Error Detect) may be used to counteract the memory bit errors. SECDED protection enables double-bit errors in an entry to be detected, and it enables single-bit errors in an entry and to detected and corrected. Double-bit errors are treated as uncorrectable errors.

The capacity of the snoop filter 138 is determined by the number N of sets of way entries and the degree of associativity. The degree of associativity D is equal to the number of way entries per set. A product of the number of sets and the degree of associativity (N×D) determines the number of cache lines that can be tracked by the snoop filter 138.

Snoop filter memory may contain a memory element for each way entry. A hardware-based pipeline may be provided for each memory element. When a memory element provides a way entry to the pipeline, the pipeline performs error detection and single-bit data correction.

Figure 2:
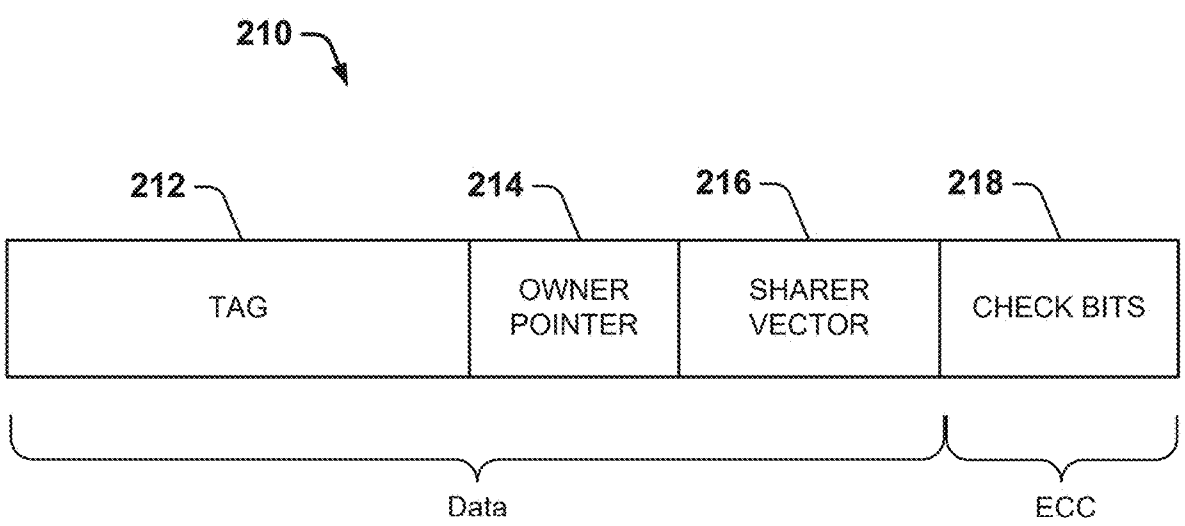
FIG. 2 shows a way entry of a snoop filter.

Reference is made to FIG. 2, which illustrates a data structure 210 for a way entry. The data structure 210 includes a first field 212 for the tag, a second field 214 for the owner pointer, a third field 216 for the sharer vector, and a fourth field 218 for the check bits. The second field 214 includes (not shown) a subfield for an owner identification, and a bit indicating whether the owner's copy of the associated cache line is valid. Hereinafter, "data" will refer to the values of the first, second, and third fields 212, 214 and 216, and "ECC" will refer to the values of fourth field 218.

Reference is now made to FIG. 3, which shows an example of a pipeline 310. Memory element 305 stores a way entry. The way entry includes raw data and a raw ECC. The data includes data bits and parity bits dispersed among the data bits.

The pipeline 310 includes a syndrome generator circuit 320 configured to receive a way entry from the memory element 305. When the syndrome generator circuit 320 receives the way entry, it generates a syndrome from the raw data and the raw ECC in the way entry. For example, the syndrome generator circuit 320 may generate each syndrome bit by selecting an ECC bit, and performing an exclusive-OR (XOR) of the selected ECC bit with a selected set of bits of the raw data. The most significant bit of the ECC is typically not used to generate the syndrome. The syndrome may be generated with a single level of XOR gates. Thus, the generation is very fast, within a single clock cycle.

The syndrome, the raw data, and the raw ECC are stored in a buffer. The buffer may be implemented with a set of flip flops 330.

A data correction circuit 340 is configured to correct the raw data with the syndrome. If the syndrome points to data bit <N> of the raw data, then data bit <N> is corrected by XORing it with 1, thereby effectively flipping data bit <N> to its opposite value. If the syndrome points to an error in the raw ECC, or if the syndrome is zero (no error in the raw data), no corrections are made to the raw data.

An error detection circuit 350 receives the most significant bit of the raw ECC—the parity bit—from the flip flops 330. The error detection circuit 350 uses the parity bit and the syndrome to determine whether the raw data had a single bit error or a double bit error. A double bit error is detected when a syndrome error is detected and no single bit error is detected. To detect a syndrome error, for example, a syndrome bus per ECC bit is formed. If the XOR of the syndrome bus per ECC bit does not match the ECC bit, then a syndrome error is detected. If a double bit error is detected, the corrected data is not good. The data correction and error detection may be performed in parallel.

A clock (not shown) supplies clock pulses to clock inputs of the memory element 305 and the flip flops 330. The memory element 305 is read at cycle N and outputs a way entry at clock cycle N+1. A syndrome is calculated, and the syndrome and the raw data and the raw ECC are captured by the flip-flops 330 in the same cycle N+1. The syndrome and the raw data and the raw ECC are available at the beginning of clock cycle N+2.

At clock cycle N+2, the data correction circuit 340 receives the raw data and the syndrome and outputs corrected data. Also at clock cycle N+2, the error detection circuit 354 receives the parity bit, together with the syndrome, and generates an error signal indicating a single bit error or a double bit error. By the end of clock cycle N+2, the outputs are the corrected data from the data correction circuit 340, and the error signal(s) and the double bit error signal from the error detection circuit 354.

Thus, there is no pipeline stall and no backpressure in the pipeline 310 if an error in the raw data occurs. Moreover, the pipeline 310 maintains high throughput performance and it is more efficient computationally than a traditional pipeline. Moving the syndrome calculation to a circuit between the memory element 305 and the flip flops 330, high drive buffer gates are eliminated. Performing the data correction and the error detection in parallel during a single clock cycle enables the multiplexer to be eliminated and the ready valid pipe to be replaced by simple flip flops.

The pipeline offers additional advantages when used in a directory having multiple snoop filters that operate in lock step. The pipelines are independent of each other. Since there is no stall in a pipeline, there is no delay to propagate to other pipelines and other snoop filters.

Figure 4:
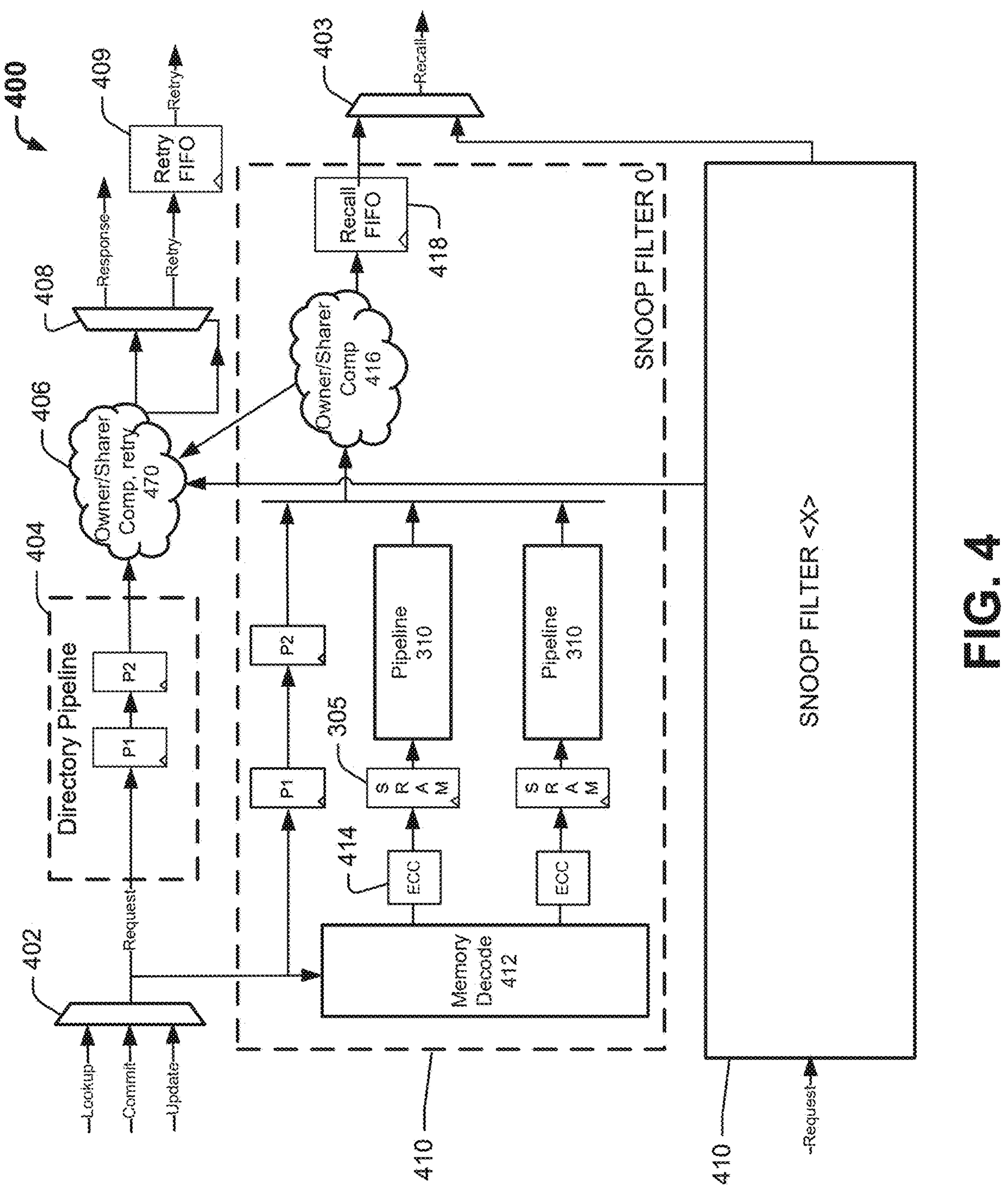
FIG. 4 shows a system directory of a cache coherent interconnect of an electronic system in accordance with various aspects and embodiments herein.

Reference is now made to FIG. 4, which illustrates a system directory 400 for a cache coherent interconnect of an electronic system. The system directory 400 includes a plurality of snoop filters 410. Each snoop filter 410 may be assigned to track a set of caching agents that share the same cache characteristics/structures.

Each snoop filter 410 stores its way entries in separate memory elements 305. For example, the system directory 400 has X=8 snoop filters 410, and each snoop filter 410 stores D=32 way entries per set, and N=32,000 sets. Therefore, the number of memory elements 305 is the product of X and D, which equals 256.

A set of requests is available to the system directory 400. In the example of FIG. 4, the requests include update, directory lookup, and commit. The appropriate request is selected by a multiplexer 402. The request contains command attribute information such as Initiator ID, and request type.

Each snoop filter 410 also includes a memory decode 412. The memory decode 412 receives a request, extracts request information such as address and command, and converts the address into an index address. The request information and index address are sent to the memory elements 305 and drive the input addresses of the memory element 305. For a directory lookup request, all way entries of all snoop filters 410 are read. For a request involving a write (e.g., an update), the write is made to a selected way entry of all of the snoop filters 410, or a way entry of a selected snoop filter 410. When the request is a directory commit, the request is handled as a write to the memory elements 305 of the snoop filter. An ECC encoder 414 generates the ECC bits that are stored along with the data in a way entry.

There is a pipeline 310 for each memory element 305. Each pipeline 310 includes a syndrome generation circuit, a set of flip flops, a data correction circuit, and an error detection circuit as described herein.

For each snoop filter 410, outputs of the data correction circuit and the error detection circuit are supplied to an owner/sharer computation circuit 416 that performs owner/sharer computation and determines replacement policy.

When a directory lookup is requested, the computation circuit 416 decodes the owner pointer and sharer vectors from its snoop filter 410 to generate an owner vector and a sharer vector for its snoop filter 410, compares the request tag address in the request to the tag address bits in the way entries in the snoop filter to determine whether a tag hit or a tag miss occurred, and reconstructs a full cache line address from the tag address bits. The lookup results (owner vector, sharer vector, hit/miss, reconstructed cache line address) are aggregated into a single directory lookup result.

If tag miss occurs and the lookup request is an allocating type, a recall request is issued. An allocating type means the requesting caching agent (the "requester") wants to hold a copy of a cache line and therefore wants to be allocated into its home snoop filter so that the home snoop filter can track whether the requester holds the cache line as an owner or sharer. The home snoop filter of the requester refers to the snoop filter in the directory 400 that is assigned to track the requester. A non-allocating type means the requester does not want to be allocated into the home snoop filter because the requester does not want to hold the cache line. The Recall request is sent to a recall FIFO 418.

On a directory level, the outputs of all of the recall FIFOs 418 are supplied to an arbiter 403. If any of the recall FIFOs 418 indicates a recall, the arbiter 403 issues a recall command.

The directory 400 has its own pipeline 404. The directory pipeline 404 includes sets of elements (e.g., flip-flops) that match the depth of the pipelines 310 of the snoop filters 410 in order to deliver request attributes that are associated with the request's results. The directory pipeline 404 and all of the pipelines 310 of the snoop filters 410 have the same depth and run in locked step and in phase.

The directory includes a retry circuit 406 that receives results (owners and sharers, if any) of the owner/sharer computation circuits 416 of the snoop filters 410. If a directory lookup can be serviced by the system directory 400, then the results of the lookup request, together with the attributes of the lookup, are sent to a transaction manager (not shown), which takes the directory lookup results uses those results to determine a set of coherent transaction operations to perform. Otherwise, the lookup request that enters and exits the directory pipeline 404 is sent out to a retry FIFO 409, and the retry FIFO 409 sends out a Retry request to the transaction manager.

Figure 5:
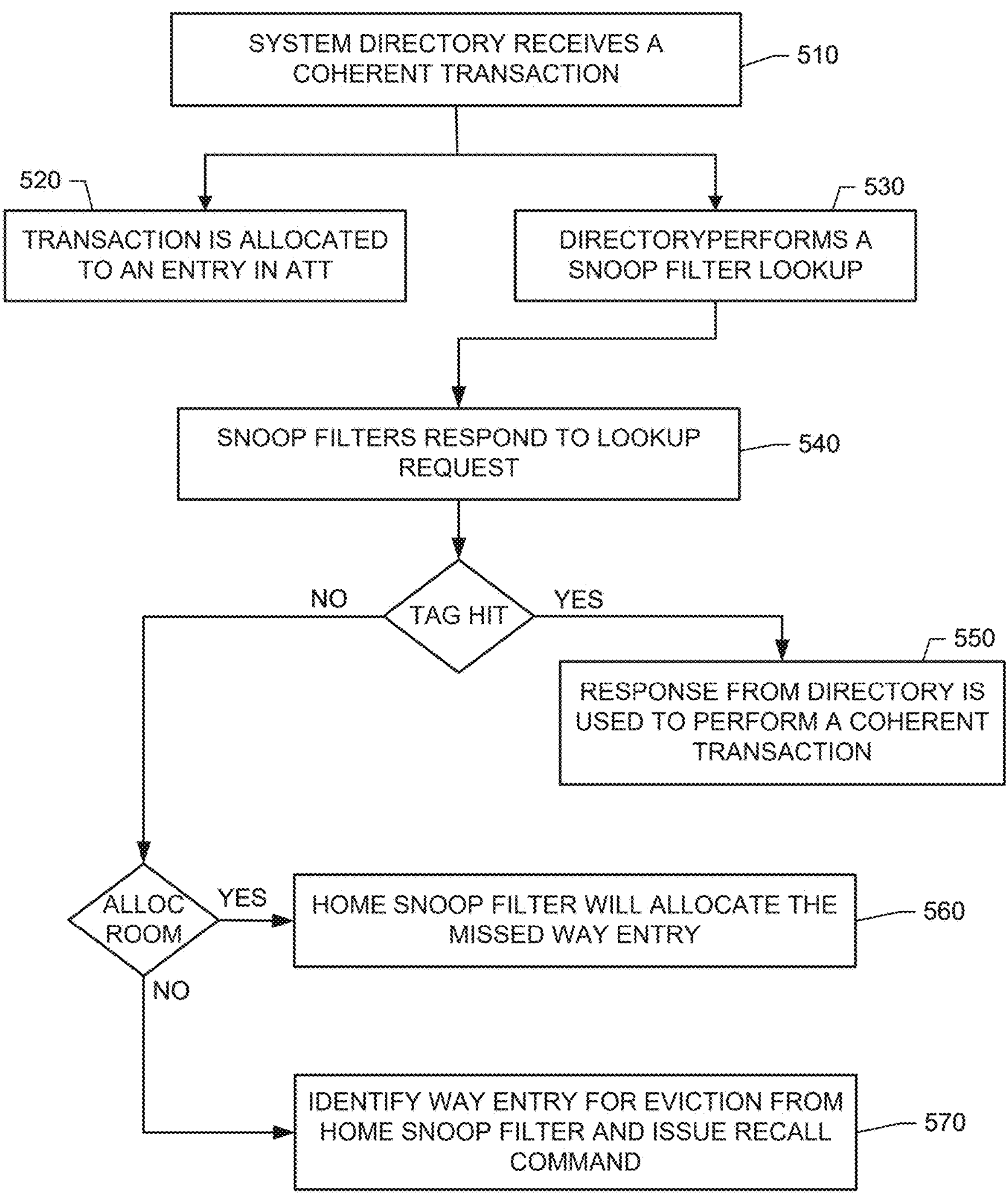
FIG. 5 shows a method of operating system directory of a cache coherent interconnect in accordance with various aspects and embodiments herein.

Reference is now made to FIG. 5, which illustrates a method of using the system directory. The method will be described in connection with a set of interfaces that abstract the presence of snoop filters in the system directory. For this example, the interfaces include a directory lookup request, a directory commit request, and a directory recall request.

At block 510, the system directory receives a coherent transaction. At block 520, the transaction is allocated to an entry in the ATT to track coherent transactions.

At block 530, which is performed in parallel with allocating the ATT entry, the directory performs a snoop filter lookup. The directory issues a directory lookup request to all snoop filters to determine the state of the caching agent caches and therefore what coherence operations (e.g., a request for a valid shared copy of a cache line, a request for a unique copy of a cache line) are required.

At block 540, each snoop filter responds to the lookup request. If, in a snoop filter, a tag of a way entry matches the request tag address, a hit occurs and the matching way entry is sent to the pipeline. The pipeline performs error correction and error detection. Owner/sharer computations are performed on an output of the pipeline. The owner/sharer computations from the snoop filters are aggregated.

At block 550, if there is a tag hit, the response from the directory is used to perform a coherent transaction. Consider the example of a coherent transaction "ReadUnique." When the result of a directory lookup request is hit and indicates an owner, the directory lookup response is delivered to, and used by, the transaction manager to issue a snoop request to the caching agent that is the owner.

At block 560, if none of the snoop filters produces a tag hit, and if an allocation into the home snoop filter is wanted for the request type, and if the home snoop filter has room to allocate the missed way entry, the home snoop filter will allocate the way entry.

At block 570, if there is no room for allocation, a way entry will be evicted from the home snoop filter and a recall transaction is issued. In response to the recall transaction, the caching agents invalidate their copies and update memory. The directory then uses the newly freed entry for the allocated cache line address. A memory operation s sent to the shared memory to deliver the cache line if none of the caching agents being snooped has that cache line.

A pipeline herein has been described in connection with a directory that has set-associative snoop filters. However, a pipeline herein is not so limited. It may be applied to a set-associative cache. For instance, pipelines herein may be used with a processor cluster having set-associate L3 cache. An N-way set-associative cache is used by a cache controller to map an address for a space in the cache. Pipelines herein may be used with a CPU having set-associative L1 cache. Pipelines herein may be used with last level cache within an interconnect (as illustrated in FIG. 1) or outside the interconnect. Different set-associative caches may be configured with multiple ways and a number of sets.

An electronic system herein is not limited to any particular cache-coherent interconnect 130. In some embodiments, however, the electronic is a system on-chip (SoC), and the cache-coherent interconnect 130 is a cache-coherent network-on-chip (NoC).

Figure 6:
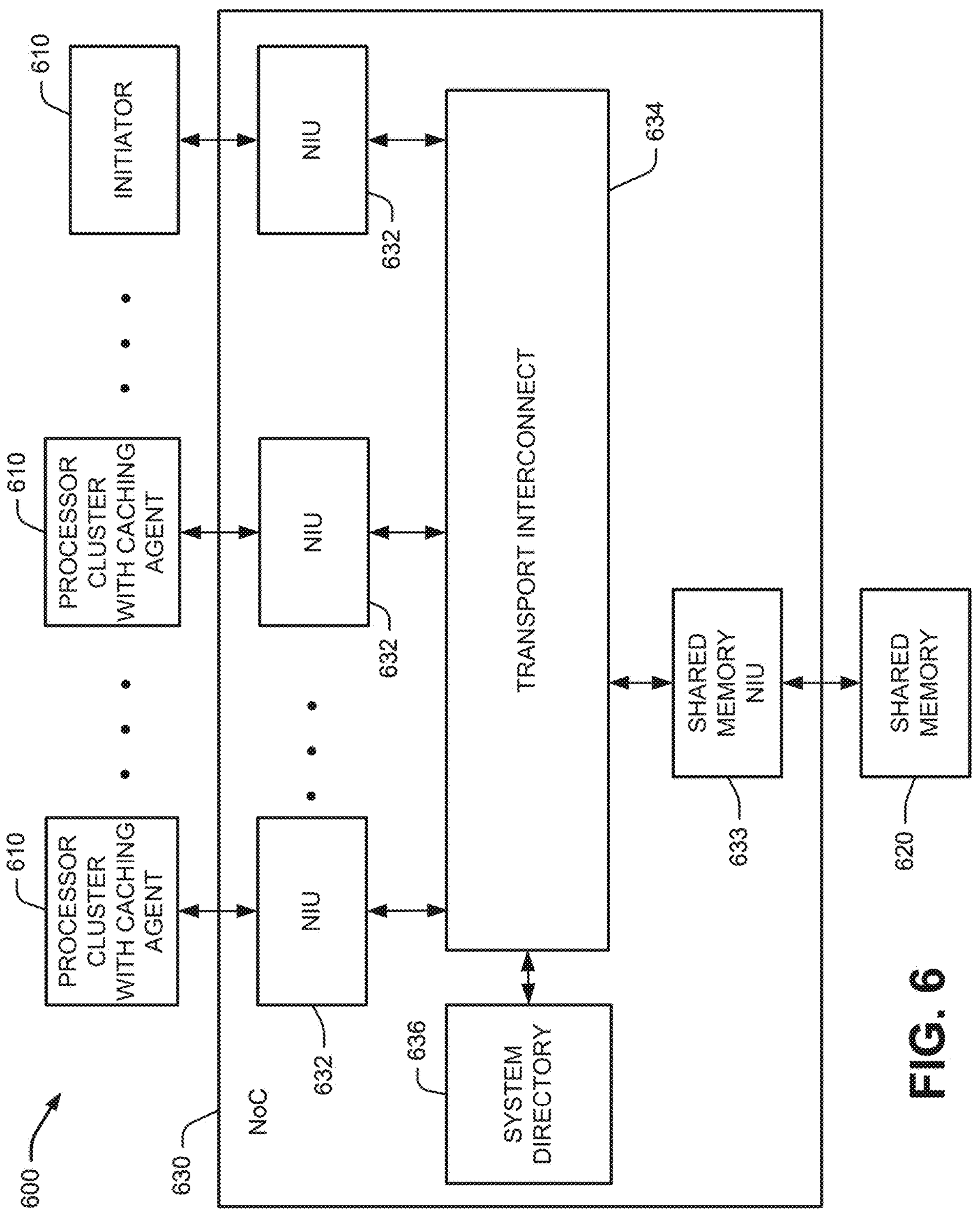
FIG. 6 shows a system-on-chip (SoC) including a cache-coherent network-on-chip (NoC) in accordance with various aspects and embodiments herein.

Reference is made to FIG. 6, which illustrates an SoC 600 including a plurality of initiators 610, shared memory 620, and a cache coherent NoC 630. At least some of the initiators 610 include processor clusters. Each processor cluster has a plurality of physical cores, and each physical core has a plurality of logical processors. The logical processors share a cache such as an L3 cache. The processor cluster further includes a caching agent, which has logic for maintaining coherency between caches in the cores and the L3 cache.

At least one of the initiators 610 may include a CPU with L1 cache that is set-associative. The set-associative L1 cache may also make use of a pipeline herein.

The initiators 610 generate request transactions. A request transaction may contain one or more destination addresses for one or more components the transaction is sent to. The address may include the address of a sub-component (e.g., an individual register within an array of registers, internal memory, etc.). The NoC 630 decodes the address and transports the request transaction to the destination address(es). The shared memory 620 handles the request transaction and sends a response transaction back to the initiator 610 via the NoC 630.

The NoC 630 includes a plurality of network interface units (NIUs) 632 and 633 and a transport interconnect 634. Each initiator 610 is coupled to the transport interconnect 634 via a corresponding NIU 632. Thus, the caching agent of each processor cluster is coupled to the transport interconnect 634 via an NIU 622. The shared memory 620 is coupled to the transport interconnect 634 via a corresponding NIU 633.

Each NIU 632 or 633 is configured to convert the protocol used by its corresponding initiator 610 or shared memory 620 into a transport protocol used inside the NoC 630. The transport protocol is typically based on the transmission of packets.

The transport interconnect 634 transports packets between the NIUs 642 and 643. The transport interconnect 634 includes switches, adapters, and buffers. Switches may be used to route flows of traffic between source and destinations. Adapters may be used to deal with various conversions between data width, clock and power domains. Buffers may be used to insert pipelining elements to span long distances, or to store packets to deal with rate adaptation between fast senders and slow receivers or vice-versa.

The NoC 630 includes a system directory 636 for maintaining cache coherence of the transport interconnect 634. The system directory includes memory and a plurality of pipelines herein.

Certain examples have been described herein and it will be noted that different combinations of different components from different examples may be possible. Salient features are presented to better explain examples; however, it is clear that certain features may be added, modified and/or omitted without modifying the functional aspects of these examples as described.

Certain methods according to the various aspects of the invention may be performed by instructions that are stored upon a non-transitory computer readable medium. The non-transitory computer readable medium stores code including instructions that, if executed by one or more processors, would cause a system or computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code comprising instructions according to various example.

Various examples are methods that use the behavior of either or a combination of machines. Method examples are complete wherever in the world most constituent steps occur. For example, IP elements or units include: processors (e.g., CPUs or GPUs), random-access memory (RAM—e.g., off-chip dynamic RAM or DRAM), a network interface for wired or wireless connections such as ethernet, WiFi, 3G, 4G long-term evolution (LTE), 5G, and other wireless interface standard radios. The IP may also include various I/O interface devices, as needed for different peripheral devices such as touch screen sensors, geolocation receivers, microphones, speakers, Bluetooth peripherals, and USB devices, such as keyboards and mice, among others. By executing instructions stored in RAM devices processors perform steps of methods as described herein.

Some examples are one or more non-transitory computer readable media arranged to store such instructions for methods described herein. Whatever machine holds non-transitory computer readable media comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

To the extent that the terms "including", "includes", "having", "has", "with", or variants thereof are used in either the detailed description and the claims, such terms are intended to be inclusive in a similar manner to the term "comprising."

The scope of the invention, therefore, is not intended to be limited to the exemplary embodiments shown and described herein. Rather, the scope and spirit of present invention is embodied by the appended claims.

What is claimed is:

1. A hardware-implemented pipeline for a set-associative snoop filter, the pipeline comprising:

a syndrome generator circuit configured to receive a way entry including raw data and raw check bits, and generate a syndrome from the raw data and the raw check bits;

a buffer configured to store the raw data, the raw check bits and the syndrome prior to data correction; and a data correction circuit configured to receive the raw data, the raw check bits, and the syndrome from the buffer and correct the raw data with the syndrome.

2. The pipeline of claim 1, wherein the buffer includes a set of flip-flops.

3. The pipeline of claim 1, wherein the raw check bits include a raw Error Correction Code (ECC); and wherein the syndrome generator circuit is configured to generate each syndrome bit by selecting an ECC bit, and performing an exclusive-OR of the selected ECC bit with a selected set of bits of the raw data.

4. The pipeline of claim 3, wherein the syndrome generator is implemented with gates that are fast enough to generate the syndrome within a single clock cycle.

5. The pipeline of claim 3, further comprising an error detection circuit operable in parallel with the data correction circuit.

6. The pipeline of claim 5, wherein the error detection circuit is configured to use the syndrome and a parity bit of the raw ECC to determine whether the raw data has a single bit error or a double bit error.

7. The pipeline of claim 5, wherein the syndrome generator circuit is configured to receive a way entry from memory; and wherein the memory and the buffer are configured with clock inputs such that:

the memory is read at clock cycle N and outputs the way entry at clock cycle N+1;

the syndrome is calculated, and the syndrome and the raw data and the raw ECC are captured by the buffer during clock cycle N+1; and at clock cycle N+2, the data correction circuit corrects the raw data with the syndrome and, in parallel, the error detection circuit uses an ECC parity bit and the syndrome to determine whether the raw data has a single bit error or a double bit error.

8. A cache coherent interconnect for an electronic system, the cache coherent interconnect comprising:
an interconnector;
a system directory for maintaining cache coherence of the interconnector, the system directory including memory for storing a plurality of snoop filter way entries; and
a plurality of pipelines for performing error correction on way entries from the memory, wherein each pipeline includes:
a syndrome generator circuit configured to receive a way entry including raw data and raw check bits, and generate a syndrome from the raw data and the raw check bits;
a buffer configured to store the raw data, the raw check bits and the syndrome prior to data correction; and
a data correction circuit configured to receive the raw data, the raw check bits, and the syndrome from the buffer and correct the raw data with the syndrome.

9. The interconnect of claim 8, wherein the raw check bits include a raw Error Correction Code (ECC); and wherein the syndrome generator circuit of each pipeline is configured to generate each syndrome bit by selecting an ECC bit, and performing an exclusive-OR of the selected ECC bit with a selected set of bits of the raw data.

10. The interconnect of claim 9, wherein the syndrome generator of each pipeline is implemented with gates that are fast enough to generate the syndrome within a single clock cycle.

11. The interconnect of claim 9, wherein each pipeline further includes an error detection circuit operable in parallel with a data correction circuit.

12. The interconnect of claim 11, wherein the error detection circuit of each pipeline is configured to use the syndrome and a parity bit of the raw ECC to determine whether the raw data has a single bit error or a double bit error.

13. The interconnect of claim 12, wherein the system directory includes timing circuitry for the snoop filters, wherein:
the memory is read at clock cycle N and outputs a way entry at clock cycle N+1;
the syndrome is calculated, and the syndrome and the raw data and the raw ECC are captured by the buffer during clock cycle N+1; and
at clock cycle N+2, the data correction circuit corrects the raw data with the syndrome and, in parallel, the error detection circuit uses an ECC parity bit and the syndrome to determine whether the raw data has a single bit error or a double bit error.

14. The interconnect of claim 12, wherein the system directory further includes circuits configured to perform owner/sharer computations on way entries provided by the pipelines.

15. The interconnect of claim 14, the system directory further includes:
a circuit configured to aggregate results of the owner/sharer computations and issue a response if there is a tag hit; and
a circuit configured to issue a recall transaction if there are no tag hits, if an allocation into a home snoop filter is wanted, and if room for the allocation will be made by evicting a way entry in the home snoop filter.

16. The interconnect of claim 8, wherein the cache coherent interconnect is a network-on-chip (NoC) and the interconnector includes a transport interconnect.

17. The interconnect of claim 16, wherein the NoC further includes last level cache with caching agent, and wherein the caching agent is connected to the transport interconnect.

18. An electronic system comprising:
a plurality of caching agents; and
a cache-coherent interconnect including a system directory and an interconnect,
wherein the caching agents are configured to communicate with the system directory via the interconnect,
wherein the system directory includes a plurality of snoop filters, each snoop filter including a plurality of way entries,
wherein the system directory further includes a plurality of pipelines, each pipeline associated with one of the way entries and performing data correction on the associated way entry; and
wherein each pipeline includes:
a syndrome generator circuit configured to receive a corresponding way entry, and generate a syndrome from raw data and raw check bits in the corresponding way entry;
a buffer configured to store the raw data, the raw check bits and the syndrome prior to data correction; and
a data correction circuit configured to receive the raw data, the raw check bits, and the syndrome from the buffer and correct the raw data with the syndrome.

19. The system of claim 18, wherein:
the raw check bits of each way entry include a raw Error Correction Code (ECC);
the syndrome generator circuit of each pipeline is configured to generate each syndrome bit by selecting an ECC bit, and performing an exclusive-OR of the selected ECC bit with a selected set of bits of the raw data; and
each pipeline further includes an error detection circuit operable in parallel with the data correction circuit and configured to use the syndrome and a parity bit of the raw ECC to determine whether the raw data has a single bit error or a double bit error.

20. The system of claim 18, wherein the electronic system is a system-on-chip (SoC) including a cache-coherent network-on-chip (NoC) and wherein the NoC includes the system directory.

* * * * *